United States Patent [19]

Lyon

[11] 4,276,720

[45] Jul. 7, 1981

[54] PLANT WATERING MAT SYSTEM

[76] Inventor: William Lyon, 116 Myers Ave., Hicksville, Long Island, N.Y. 11801

[21] Appl. No.: 942,535

[22] Filed: Sep. 15, 1978

[51] Int. Cl.$^3$ ............................................. A01G 27/00
[52] U.S. Cl. ........................................ 47/39; 47/14; 47/81; 47/82
[58] Field of Search .................. 47/81, 80, 39, 63, 64, 47/60, 61, 14, 16, 82; 211/126, 188, 194; 239/44, 80

[56] References Cited

U.S. PATENT DOCUMENTS

| 681,098 | 8/1901 | Brown | 211/126 |
|---|---|---|---|
| 1,085,780 | 2/1914 | Adams et al. | 47/16 |
| 1,281,390 | 10/1918 | Kelling | 239/44 |
| 1,762,596 | 6/1930 | Soper | 211/126 |
| 1,989,403 | 1/1935 | Davernheim | 47/80 |
| 3,314,192 | 4/1967 | Park | 47/39 X |
| 3,576,088 | 4/1971 | Arca | 47/81 |
| 3,772,827 | 11/1973 | Ware | 47/39 |
| 3,778,928 | 12/1973 | Green | 47/80 |
| 3,885,843 | 5/1975 | Rubel | 47/81 X |

FOREIGN PATENT DOCUMENTS

| 759799 | 5/1967 | Canada | 211/126 |
|---|---|---|---|
| 2158366 | 3/1973 | Fed. Rep. of Germany | 47/80 |
| 1205202 | 2/1960 | France | 47/81 |
| 1414605 | 9/1965 | France | 47/80 |
| 463422 | 5/1951 | Italy | 47/14 |
| 465067 | 8/1951 | Italy | 47/81 |
| 1069571 | 5/1967 | United Kingdom | 47/81 |
| 1194153 | 6/1970 | United Kingdom | 47/80 |

OTHER PUBLICATIONS

"Further Studies with the Capillary Mat", Hannings, et al., Florists' Review, Mar. 28, 1974.
"Something New for Capillary Watering", Hammer & Langhans, Florists' Review, Aug. 31, 1972.

*Primary Examiner*—Steven A. Bratlie
*Attorney, Agent, or Firm*—Darby & Darby

[57] ABSTRACT

A plant watering system including a tray having a platform thereon in which a water absorbent mat is located. The mat extends into the tray in which water is located and water is absorbed from the tray into the mat by capillary action. The plants are located on the mat and are provided with water directly to the plant bottom and water is available to provide humidity to the leaves. A stackable arrangement is provided so that one tray can be stacked on top of another one.

5 Claims, 3 Drawing Figures

PLANT WATERING MAT SYSTEM

Various watering systems have been proposed for house plants. Such watering systems are necessary to insure that the plants are provided with the proper amount of water so that they will be properly maintained and will grow.

A typical watering system involves a housewife or plant keeper who will water the plant on a daily, or every several days, basis. Such an arrangement is bothersome and, if the plant owner forgets to water the plant, then the plant will wither and die or else will not bloom.

Various other types of systems have been proposed. One of thse is, for example, a capillary system which has a central reservoir with a number of tubes extending therefrom, the free ends of one or more of these tubes being placed in a plant. Such an arrangement is rather cumbersome and, also, can be relatively expensive. Also, there is the problem of having the tubes located at various parts of the house. This system also does nothing with respect to supplying the proper humidity to the plants. Another system involves a container having a portion for storing water and a stake which is implanted into the flower pot. Water is drawn from the container into the pot through the stake which has a hole therein. This has a disadvantage in that a separate container must be provided for each pot.

None of the foregoing systems also has the advantage of controlling the humidity for the plant. That is, water is supplied directly to the surface of the flower pot and there is no provision for providing the proper humidity to the leaves of the plant.

A plant irrigation system is disclosed in the Green U.S. Pat. No. 3,778,928 wherein the plants in pots are placed on plastic panels with a sand finish. Various types of water supply and drain arrangements are disclosed which give rise to a relatively complicated system.

The present invention relates to a potted plant watering system and, more particularly, to a watering system which is designed for ease of operation, and can provide water for a plant for an extended period of time and also can provide the plant with proper humidity. In addition, the watering system is capable of supporting a number of plants at the same time and an embodiment is disclosed wherein trays are utilized which can be stacked one on top of the other.

In accordance with the invention, the watering system includes a tray having a compartment for holding water. The tray includes a platform on which a water absorbent mat is provided, the mat extending into the tray compartment where the water is stored to absorb the water therefrom. The plant pots are placed on top of the mat and the soil of the plants are provided water through the holes in the bottom of the pots. A plurality of plants can be supported by a single tray. Also, in a preferred embodiment of the invention, the trays are made so that they can be stacked one on a top of another. The system of the invention is useful not only in a home environment but also, for example, in displaying plants for sale in stores.

It is therefore an object of the invention to provide a house plant watering system.

A further object is to provide a house plant watering system utilizing a water absorbent mat which is placed on a water containing tray.

An additional object is to provide a house plant watering system formed by a plurality of trays each of which has a water absorbent mat thereon on which the pots for the house plants are placed, the trays being stackable one above the other.

Other objects and advantages of the present invention will become more apparent upon reference to the following specification and the annexed drawings in which.

Figure 1:
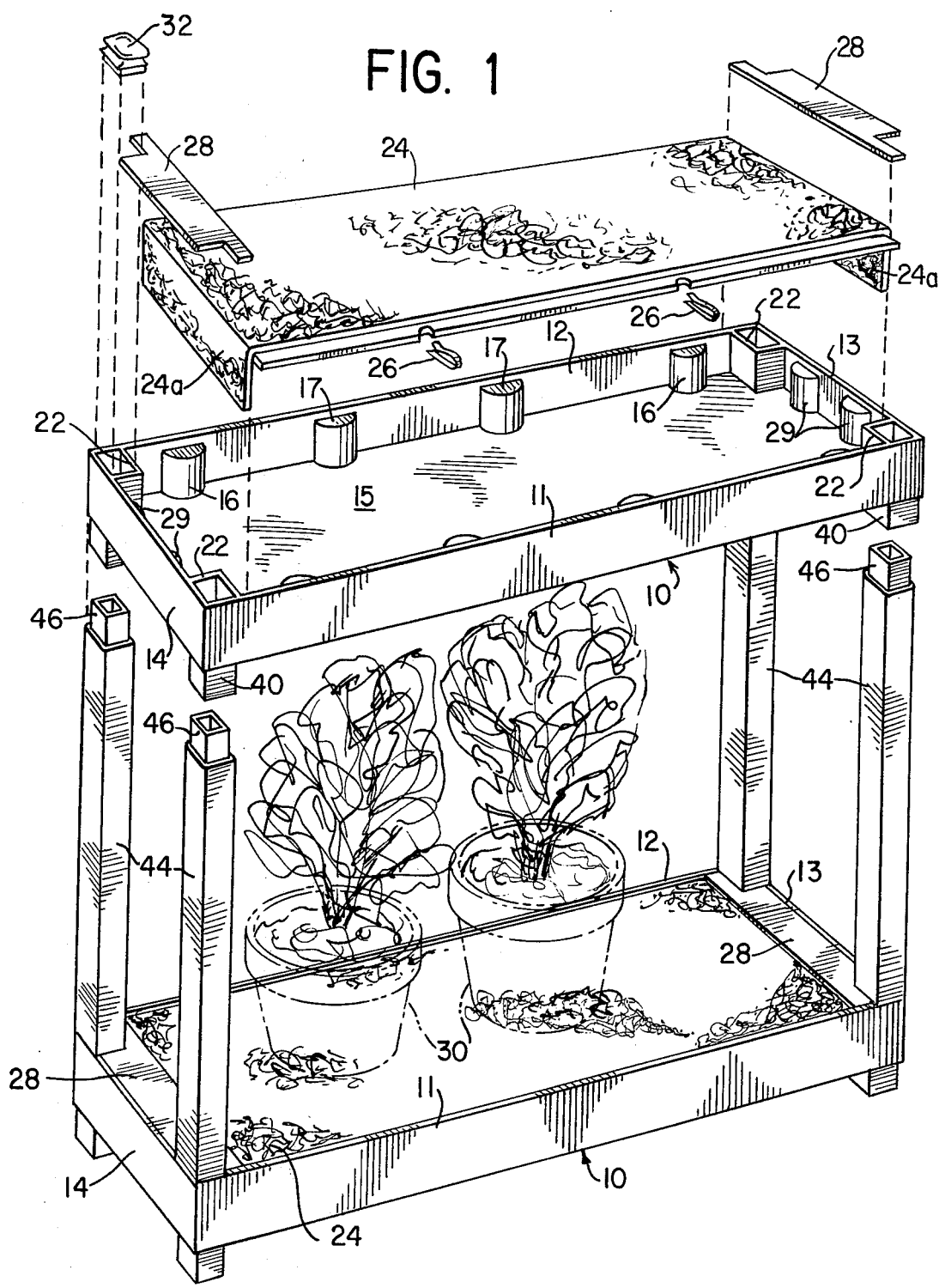
FIG. 1 is a perspective partly exploded view of a potted plant watering tray in accordance with the present invention.

Referring to the drawings, the watering tray 10 is shown as a hollow generally rectangular unit made of any suitable waterproof material, for example a plastic such as polystyrene, ABS plastic, etc. It is preferred that tray 10 be made of a relatively strong plastic so that it has sufficient structural rigidity. Tray 10 has front and back walls 11 and 12 and side walls 13 and 14, and a bottom wall 15.

A plurality of support posts 16 are formed on the front and back walls 11 and 12. The support post 16 can be solid or hollow and of any suitable shape, for example, semi-circular, square, or rectangular. The top 17 of each post 16 terminates a distance from the top of each of a respective front and back wall 11 and 12 such that a platform member 20 can be placed thereon with the platform member 20 being substantially flush or somewhat below, the top of each of the walls 11, 12, 13, 14. The platform member 20 is wide enough to span the distance between the front and back walls 11 and 12 and long enough to terminate short of each of the end walls 13, 14 leaving a space for purposes described below. The platform 20 is also preferably made of a waterproof material such as plastic which can be polystyrene or ABS plastic.

In each corner of the tray 10 a receiving socket 22 is formed. Socket 22 is shown as being essentially a square or generally rectangular wall which is formed in each of the corners. The purpose of the receiving socket is also described in greater detail below.

The platform 20 is covered with a mat 24 of a water absorbent and conducting material. One typical material which can be used is, for example a mat of a woven, loose fiber rayon-cotton material. A suitable mat material is made and sold under the name of the Troy Watering Mat. The mat 24 is as wide as platform 20 and somewhat larger. It is wrapped around the platform 20 and is held on the sides thereof by clips 26 which are relatively small and which extend into cut outs on the sides of platform 20. Suitable clips may also be used at the ends of the platform 20.

When the platform 20 is laid on the support posts 16, the ends of mat 24 are made long enough to extend down from the platform 20 to rest on or be slightly above the floor of the tray 10. Thus, water is supplied to the mat.

The assembly and operation of the system is as follows. The mat 24 is placed over the platform 20 and clipped thereon by the clips 26. The tray is filled with water, usually about one-half to two thirds full, and the platform-mat combination laid on the support posts 16. A typical tray, depending upon its width, length, and depth can hold up to several gallons of water. Thus, there is an adequate supply of water for a relatively long period of time. The ends 24a of the mat 24 extend into the water and the water is conducted into, up and through the entire surface of the mat 24 by a capillary type action. The entire surface of mat 24 is wet.

Figure 3:
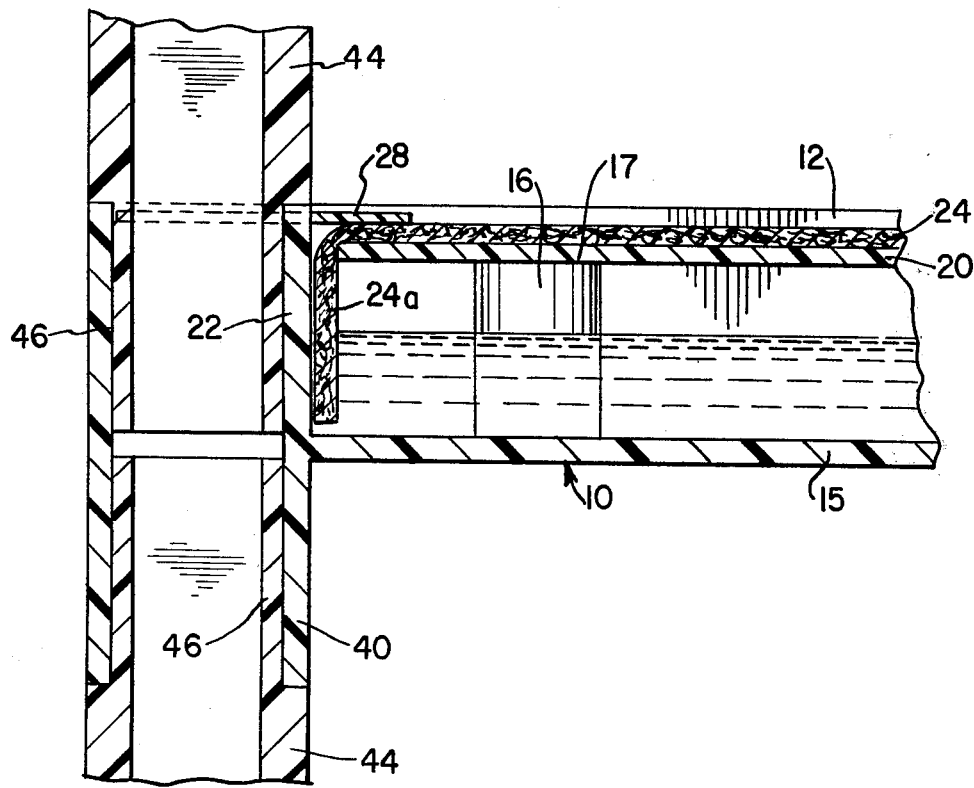
FIG. 3 is a detail of the end of a tray.

The open areas at each end of the platform into the tray 10, are closed off by a cover plate 28 which also can be of plastic. The cover plate is T-shaped with notched ends. The wider top end of the cover plate 28 rests on the mat 24 (see FIG. 3) and the narrower lower end rests on support posts 29 at each end of the tray. Once the tray has been assembled, it can initially or thereafter be filled with water by removing one of the cover plates 28.

The flower pots, two illustratively shown in FIG. 1 and each bearing the number 30, are placed on top of the mat and are supported by the platform 20. The water is provided to the soil in the pots 30 through the mat up through the holes in the bottom of the pots. Such holes are conventionally formed in the pots. As should be apparent, humidity is also provided to the leaves of the plant since there is water by the mat at all areas throughout the platform 20. This arrangement has been found to be highly beneficial with respect to the growing of the plants.

Where only a single tray arrangement is to be used, the corner sockets 22 can be eliminated and these can be made as supporting members like the posts 16. In a single tray arrangement, one end of the platform 20 can be brought out to a tray side wall 14 leaving only one opening into the tray through which the water can be placed.

Where a tray with sockets 22 is used as the top tray, as it is shown in FIG. 1, Caps 32 are provided to close off the sockets 22. The caps are made of rubber or plastic.

FIG. 1 also shows a stacking arrangement for several trays 10. Here, a receiving socket 40 is found on the bottom corner of each of the trays 10. The receiving socket is generally the same shape as the socket 22. As shown, the trays are stacked by placing a leg 44 having reduced thickness ends 46 into the socket 40 of the bottom of an upper tray and into the socket 22 of a lower tray. The legs 44 are also preferably of plastic. By using a leg at each corner, a satisfactory mounting arrangement is provided for stacking two trays. Several trays can be stacked, for example, three or four.

As can be seen in FIG. 1, the sockets 40 on the lower tray serve as legs for the unit. Thus, only a single type tray need be made for both upper and lower trays. This greatly simplifies the manufacturing process and reducing costs.

Figure 2:
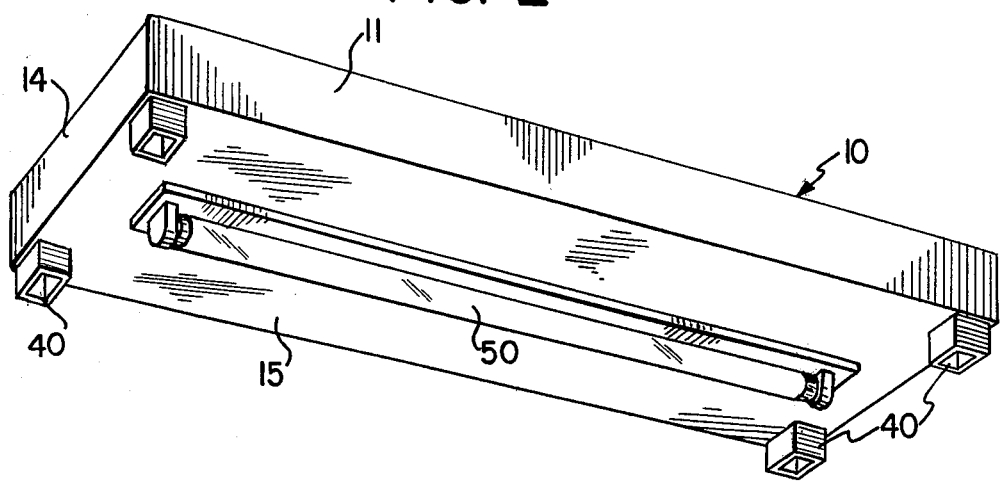
FIG. 2 is a perspective view showing the underside of one of the trays for holding a lamp.

FIG. 2 shows a further modification in which a fluorescent lamp 50 is placed on the underside of the floor of one tray 10, which would normally be an intermediate or upper tray in a stacked arrangement. The fixture can be held, for example, to the tray by adhesive strips on the underside of the floor. The lamp can be of the type used for stimulating plant growth, several of such lamps being available commercially.

As should be apparent, the system of the present invention can be used with one tray or with stacked trays. In each case, a number of pots can be held on a platform and each plant is supplied water and adequately humidified.

While the platform 20 has been shown as solid it also can be of a mesh framework. The platform can be fixedly attached to the tray rather than demountable although this is preferred so that the mat can be changed if it wears out or becomes dirty or if it is to be washed. Also, while the supports for the platform 20 are shown as support posts 16 fixed in the tray, it should be understood that the platform itself can be provided with legs or posts to rest on the floor of the tray.

What I claim is:

1. A watering and humidifying system for potted plants comprising:

a tray having a bottom wall and side and end walls defining a reservoir for holding water throughout substantially the entire interior area of said tray, a platform for holding plant pots, means for mounting said platform to said tray for the lower surface of said platform to close off the major portion of said reservoir, the upper surface of said platform being substantially larger in surface area than the bottom of any one pot to be held, said platform terminating short of each of said end walls to provide a space between said platform and each said end wall for providing communication with the reservoir to supply water thereto from the top of said tray through at least one of said spaces without removing said platform, cover means for closing a part of each said space, means in the portion of each said space left uncovered by said cover means for accepting and holding a stacking means to permit another tray to be stacked on said first named tray, a watering mat of fabric material located on and covering the major portion of the area of the upper surface of said platform, said platform and the tray formed to provide a space between an edge of the platform and one of the walls of the tray such that a portion of the mat extends into the reservoir to draw water from the reservoir by capillary action, the upper surface of said mat being uncovered and the water being conveyed to the entire surface area of the mat to provide water directly to the bottom of a pot placed on the mat and also to evaporate into the area surrounding any pot on the platform water from the portions of the mat left uncovered by pots to provide by the evaporation humidity to the foliage of any plant of a pot on the mat.

2. A plant watering and humidifying system as in claim 1 wherein said tray has a plurality of internal supporting posts on which the platform rests.

3. A plant watering and humidifying system as in claim 1 wherein said means in each said space for accepting and holding stacking means of another tray comprises leg receiving sockets in each said space of one tray and said stacking means comprises leg receiving sockets on the bottom of another tray, and legs extending between said sockets of said one tray and said another tray.

4. A plant watering and humidifying system as in claim 1 wherein there is a space between each of the opposing ends of the platform and the corresponding walls of the tray with the mat extending across the platform and each end extending through the respective space into the reservoir.

5. A plant watering and humidifying system as in claim 1 further comprising a light source on the bottom surface of the bottom wall of a tray which is located above another tray.

* * * * *